(12) United States Patent
Nelson

(10) Patent No.: US 12,193,425 B2
(45) Date of Patent: Jan. 14, 2025

(54) HANDS FREE DEHOOKING DEVICE

(71) Applicant: Brady J. Nelson, Myakka City, FL (US)

(72) Inventor: Brady J. Nelson, Myakka City, FL (US)

(73) Assignee: Overboard, VVC, Myakka City, FL (US)

( * ) Notice: Subject to any disclaimer, the term of this patent is extended or adjusted under 35 U.S.C. 154(b) by 185 days.

(21) Appl. No.: 17/828,000

(22) Filed: May 30, 2022

(65) Prior Publication Data

US 2022/0287287 A1 Sep. 15, 2022

Related U.S. Application Data

(63) Continuation-in-part of application No. 16/841,011, filed on Apr. 6, 2020, now Pat. No. 11,344,019, which is a continuation-in-part of application No. 15/139,409, filed on Apr. 27, 2016, now Pat. No. 10,653,126.

(51) Int. Cl.
*A01K 97/18* (2006.01)

(52) U.S. Cl.
CPC ................... *A01K 97/18* (2013.01)

(58) Field of Classification Search
CPC ......... A01K 97/18; A01K 97/20; A01K 97/00
USPC ............. 43/53.5, 55; 81/124.2, 124.5, 177.7, 81/177.8, 177.9; 7/106
See application file for complete search history.

(56) References Cited

U.S. PATENT DOCUMENTS

| | | | | |
|---|---|---|---|---|
| 2,516,620 A * | 7/1950 | Darling | ................... | A01K 97/14 294/26 |
| 2,725,253 A * | 11/1955 | Wallman | ................... | B66C 1/34 294/26 |
| 4,342,171 A * | 8/1982 | Cripps | ................... | A01K 97/18 43/53.5 |
| 4,598,492 A * | 7/1986 | Stanfield | ................ | A01K 97/14 294/19.3 |
| 4,833,817 A * | 5/1989 | Silverthorn | ............ | A01K 97/18 43/53.5 |
| 4,995,188 A * | 2/1991 | Ewing | ..................... | G01G 19/60 177/127 |
| 5,307,586 A * | 5/1994 | Palmer | ................... | A01K 97/18 43/53.5 |
| 7,178,845 B1* | 2/2007 | Metzger | ................ | E05B 1/0053 294/169 |
| 9,485,980 B1* | 11/2016 | Latta | ....................... | A01K 97/18 |
| 10,562,597 B2* | 2/2020 | Lange | ..................... | B63B 21/54 |
| 11,758,894 B2* | 9/2023 | Luaces | ................... | A01K 65/00 43/5 |

(Continued)

FOREIGN PATENT DOCUMENTS

GB 873063 A * 7/1961

*Primary Examiner* — Morgan T Jordan
*Assistant Examiner* — Hae Rie Jessica Byun
(74) *Attorney, Agent, or Firm* — Lewellyn Law, PLLC; Stephen Lewellyn

(57) ABSTRACT

A rotatable, hands free fish dehooking device used for safely removing hooks and lures from a fish's mouth and/or body. The hands free dehooking device has a rigid ring located on an end of an elongated arm that is mounted to a fixed or stationary object, such as a box, boat, or other object that anchors the ring and arm in a fixed position for use. The ring and arm may also be rotatable between stored and in-use positions.

12 Claims, 13 Drawing Sheets

(56) References Cited

U.S. PATENT DOCUMENTS

2005/0178249 A1* 8/2005 Cole .................. B25G 1/063
                81/177.8

* cited by examiner

HANDS FREE DEHOOKING DEVICE

CROSS-REFERENCE TO RELATED APPLICATIONS

This application is a continuation-in-part of U.S. patent application Ser. No. 16/841,011, filed Apr. 6, 2020, which is a continuation-in-part of U.S. patent application Ser. No. 15/139,409 filed on Apr. 27, 2016, which are incorporated herein by reference in their entirety.

FIELD OF THE INVENTION

This invention relates to devices used for removing hooks from fish and other aquatic life and more particularly, a rotatable dehooking device that is mounted in a fixed location, thereby making the dehooking device hands free.

BACKGROUND OF THE INVENTION

There are many circumstances when a fisherman catches a fish and needs to safely remove a hook from the fish without causing harm to the fish. One circumstance is when a fish is caught and is too immature and/or small to keep. In most of these cases, fisherman are required by law to return the fish to the water. Another circumstance is when fisherman fish using the practice of "catch and release," wherein fish are only caught for the sport of catching the fish and the fisherman has no intention of keeping the fish. An additional circumstance is when a fisherman catches an undesirable fish or other aquatic life that is un-edible and/or dangerous to handle.

In any of these cases, the fisherman must be careful not to injure himself/herself and/or the fish while removing the fishing hook from the fish.

Often a fish hook is removed or dehooked from a fish with pliers. This method requires the fish to be lifted out of the water and held while the pliers are used to pry the hook out of the fish's mouth. This method puts extra stress on the fish and often tears more tissue than necessary to remove the hook. In addition, this method requires that the fisherman touch the fish which could harm the fish's scales and/or fins to such an extent that the fish will not survive after being returned to the water.

Current dehooking devices available to anglers are handheld devices that require the fisherman to bring the fish onto shore and/or onto a boat to remove the hook. These handheld devices also require the fisherman to relinquish control of the fishing pole and/or for a second person to be present to assist in the removal of the hook. All of these factors contribute to a higher probability of the fisherman and/or the fish being unnecessarily injured during the hook removal process.

Therefore, the need exists for a rotatable dehooking device that is mounted in a fixed location, thereby making the dehooking device hands free.

SUMMARY OF THE INVENTION

The primary object of the present invention is to provide a hands free fish dehooking device that is mounted in a fixed location, thereby making the dehooking device hands free.

The present invention fulfills the above and other objects by providing a hands-free fish dehooking device used for safely removing hooks and hires from a fish's mouth and/or body. The present invention comprises a rigid ring located on an end of an arm that is mounted to a fixed object, such as a box, boat, or other object that anchors the ring in a fixed position for use. The ring preferably comprises an opening through which a user may slip a fishing line into the center of the ring. The ring is preferably mounted in a horizontal position so that when the user pulls upward on the fishing line, a hook and fish located on a distal end of the line comes into contact with the ring, thereby causing the hook to become dislodged from the fish and the fish to fall back into the water or into a storage container, depending on the position of the dehooking device.

The dehooking device may be mounted over or in a storage container. Alternatively, the dehooking device may be mounted on or near the edge of a boat so the arm and ring extend over the water. This allows the fish to be removed from the hook without a user touching the fish which can cause physical damage to the fish and in some cases the fish to die shortly after being released. In one embodiment of the present invention, the dehooking device may be mounted to a boat railing on a motor boat or to a kayak or similar boat via a swiveling mount that allows a user to rotate the dehooking device from a stored position to The mount may be an elongated channel rail that allows the arm to be attached so it is capable of rotating and sliding within the channel rail, thereby allowing a user to adjust the arm into a desired position and to remove the arm entirely if desired.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
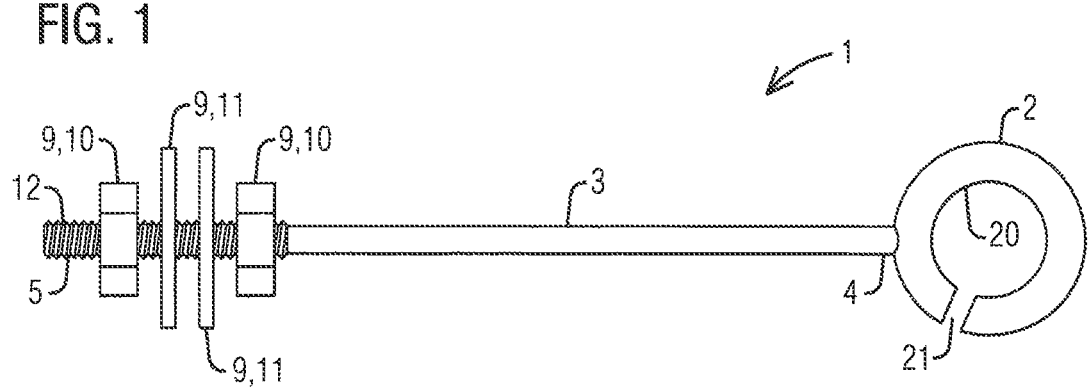
FIG. 1 is a perspective top view of a hands free dehooking device of the present invention.
Figure 2:
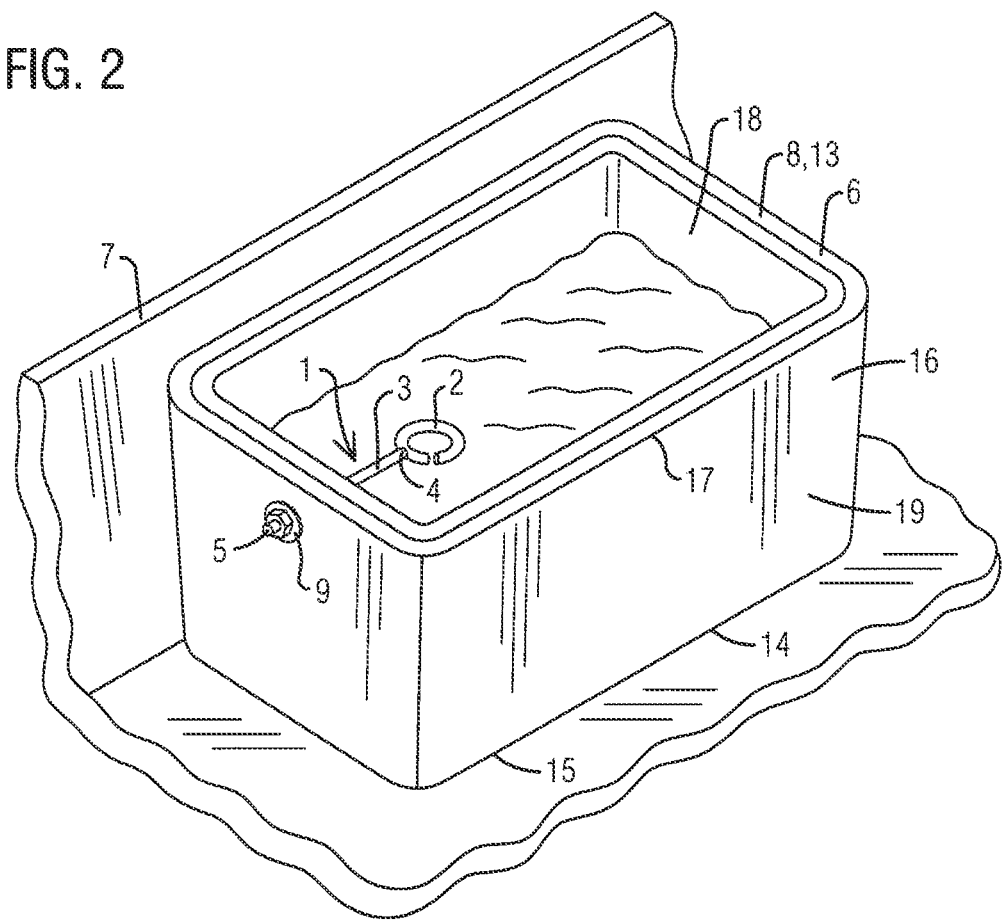
FIG. 2 is a perspective top partial cutaway view of a storage box or live well on a boat having a hands free dehooking device of the present invention installed therein.

With reference to FIGS. 1 and 2, a perspective top view of a hands free dehooking device 1 of the present invention and a perspective top partial cutaway view of a storage box 8 or live well 13 on a boat having a hands free dehooking device 1 of the present invention installed therein, respectively, are illustrated. The hands free dehooking device 1 of the present invention comprises a preferably rigid ring 2 located on a distal end 4 of an elongated arm 3. A proximal end 5 of the arm 3 is preferably mounted to an object 6, such as a boat 7, dock, storage box 8, cooler, base or any other object that anchors the hands free dehooking device 1 in place and allows an individual to use the hands free dehooking device 1 in a hands free manner. The hands free dehooking device 1 is mounted to the object 6, via at least one mounting means 9 that secures the proximal end 5 of the elongated arm 3 to the object 6. As illustrated in FIG. 1, the mounting means 9 comprises at least one nut 10 and at least one washer 11 secured to a threaded portion 12 of the hands free dehooking device 1. The at least one mounting means 9 may also comprise a bolt, bracket, screw, adhesive, rivet, clamp and so forth. The dehooking device 1 is mounted to a storage box 8 for storing caught fish, such as a cooler, live well 13, bucket and so forth, via a threaded portion 12 located on the proximal end 5 of the arm 3 of the dehooking device 1 and washers 11 and nuts 10 that engage the threaded portion 12. The storage box 6 comprises a floor panel 14 having a perimeter edge 15 from which at least one perimeter wall 16 extends upward perpendicularly a predetermined distance terminating at an upper edge 17. Said perimeter wall 16 comprises and inner surface 18 and an outer surface 19. The ring 2 and arm 3 are preferably mounted in a horizontal position in relation to the floor panel 14 of the storage box 6. The dehooking device may have a foldable arm 3, telescoping arm 3 and/or an interchangeable arm 3 that allows a user to adjust the length of the dehooking device 1 according to the object 6 it is being mounted to.

The positioning of the dehooking device 1 on the inner surface 18 of the at least one perimeter wall 16 allows a fish to drop directly into the storage box 6 after a hook is removed from the fish. The ring 2 surrounds central aperture 20. A slot 21 is located in the ring allows a user to insert a fishing line 22 through the ring 2 and into the central aperture 20.

Figure 3:
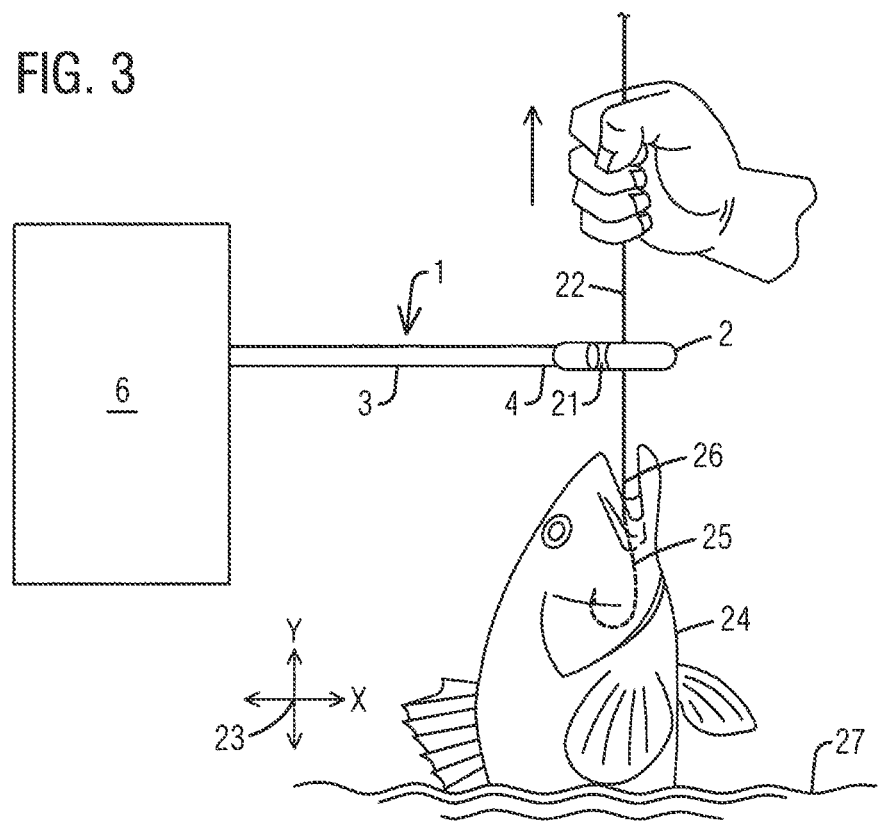
FIG. 3 is a side view of a hands free dehooking device of the present invention mounted to a stationary base and in use.
Figure 4:
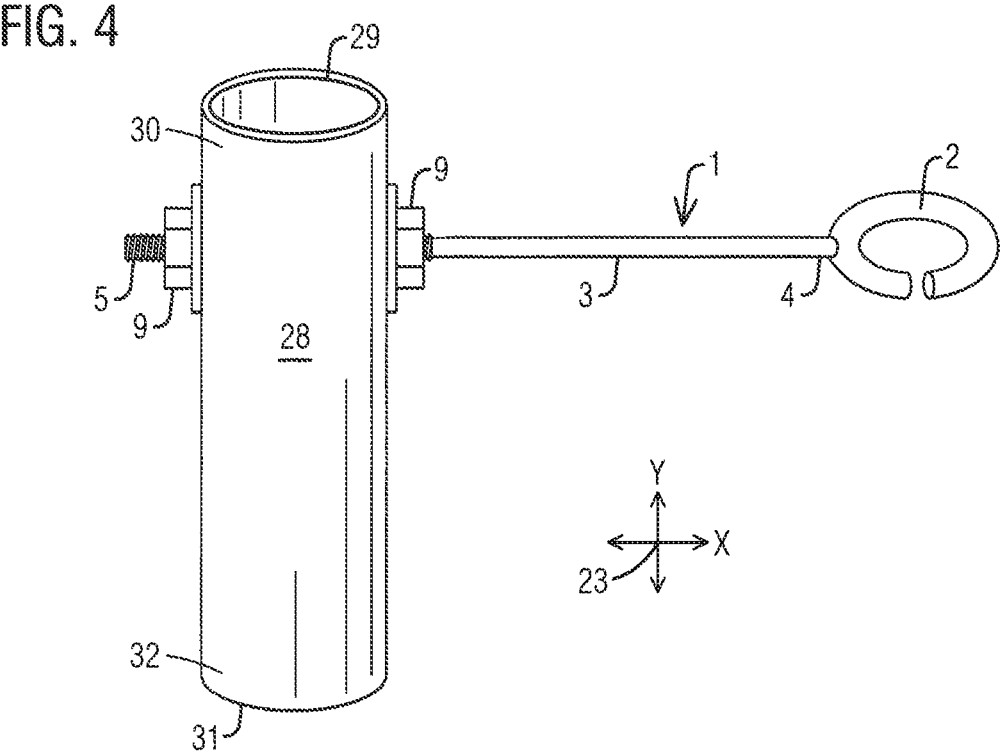
FIG. 4 is a side view of a hands free dehooking device of the present invention having a tubular-shaped base.
Figure 5:
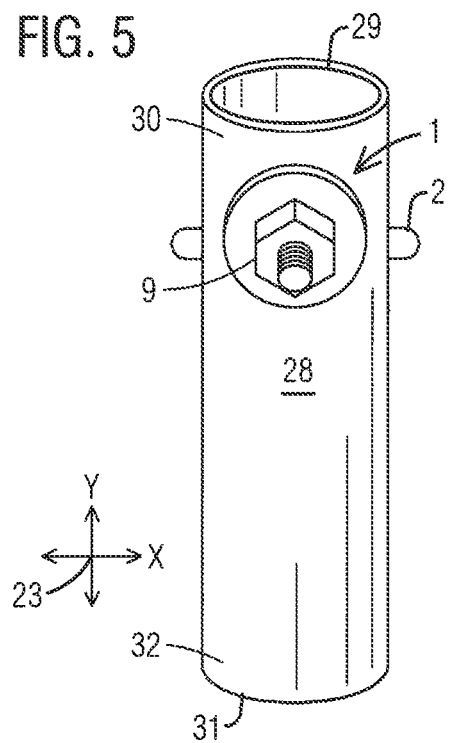
FIG. 5 is a rear view of a hands free dehooking device of the present invention having a tubular-shaped base in a vertical positions.
Figure 6:
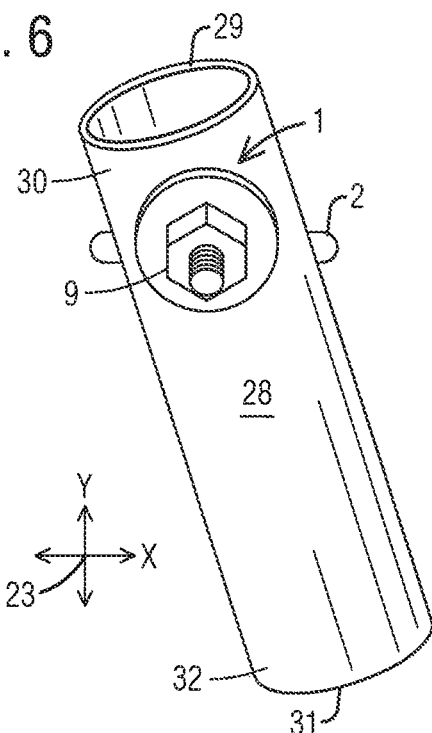
FIG. 6 is a rear view of a hands free dehooking device of the present invention having a tubular-shaped base in an angle position.

With reference to FIG. 3, a side view' of a hands free dehooking device 1 of the present invention mounted to a stationary base 6 in use is illustrated. A slot 21 located in the ring allows a user to insert a fishing line 22 through the ring 2 and into the central aperture 20 of the ring 2 so that the fishing line 22 is in substantially perpendicular position to the arm 3 and the ring 2 when the fishing line 22 is held in an upright position over the ring 2 (as compared to an X-Y axis 23), while being weighed down with a fish 24 caught on a hook 25 located on a distal end 26 of the fishing line 22 located below the ring 2. When the user pulls upward on the fishing line 22, the hook 25 and fish 24 located on the distal end 26 of the fishing line 22 comes into contact with the ring 2, thereby causing the fishing hook 25 to become dislodged from the fish 24. The fish 24 will then fall into the water 27 below.

Figure 7:
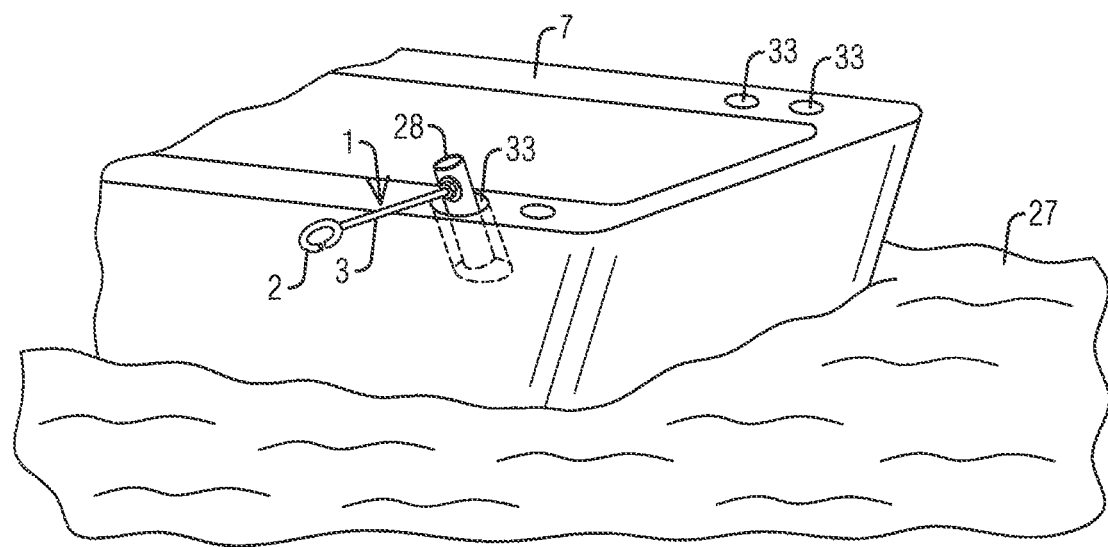
FIG. 7 is a rear view of a hands free dehooking device of the present invention having a tubular-shaped base in use on the boat.

With reference to FIGS. 4-7, various views of a hands free dehooking device 1 of the present invention having a tubular-shaped base 28 are illustrated. The dehooking device 1 of the present invention may be mounted on or near the edge of a boat 7 so the arm 3 and ring 2 extend over the water 27 when in use, as illustrated in FIG. 7. This allows fish to be removed from the hook and released directly back into the water 27 without a user touching the fish, which can cause physical damage to the fish and in some cases the fish to die shortly after being released. As illustrated here, the hands free dehooking device 1 of the present invention comprises a preferably rigid ring 2 located on a distal end 4 of an elongated arm 3. A proximal end 5 of the arm 3 is mounted to a tubular-shaped base 28 either integrally or via at least one mounting means 9. The tubular-shaped base 28 comprises a top end 29 having an upper portion 30 of the tubular-shaped base 28 located proximal thereto and a bottom end 31 having a lower portion 32 of the tubular-shaped base 28 located proximal thereto. The proximal end 5 of the arm 3 extends perpendicularly from the upper portion 30 of the tubular-shaped base 28, thereby allowing the lower portion 23 of the tubular-shaped base 28 to be inserted into a fishing rod holder 33 located on a boat 7, as illustrated in FIG. 7.

The angle of the tubular-shaped base 28 is preferably adjustable in relation to the arm 3 to allow the tubular-shaped base 28 to be inserted into a vertical fishing pole holder 33 or an angled fishing pole holder 33 while the arm 3 and ring 2 are adjusted to maintain a parallel position (as compared to an X-Y axis 23) in relation to the water 27 over which the arm 3 and ring 2 extend.

Figure 8:
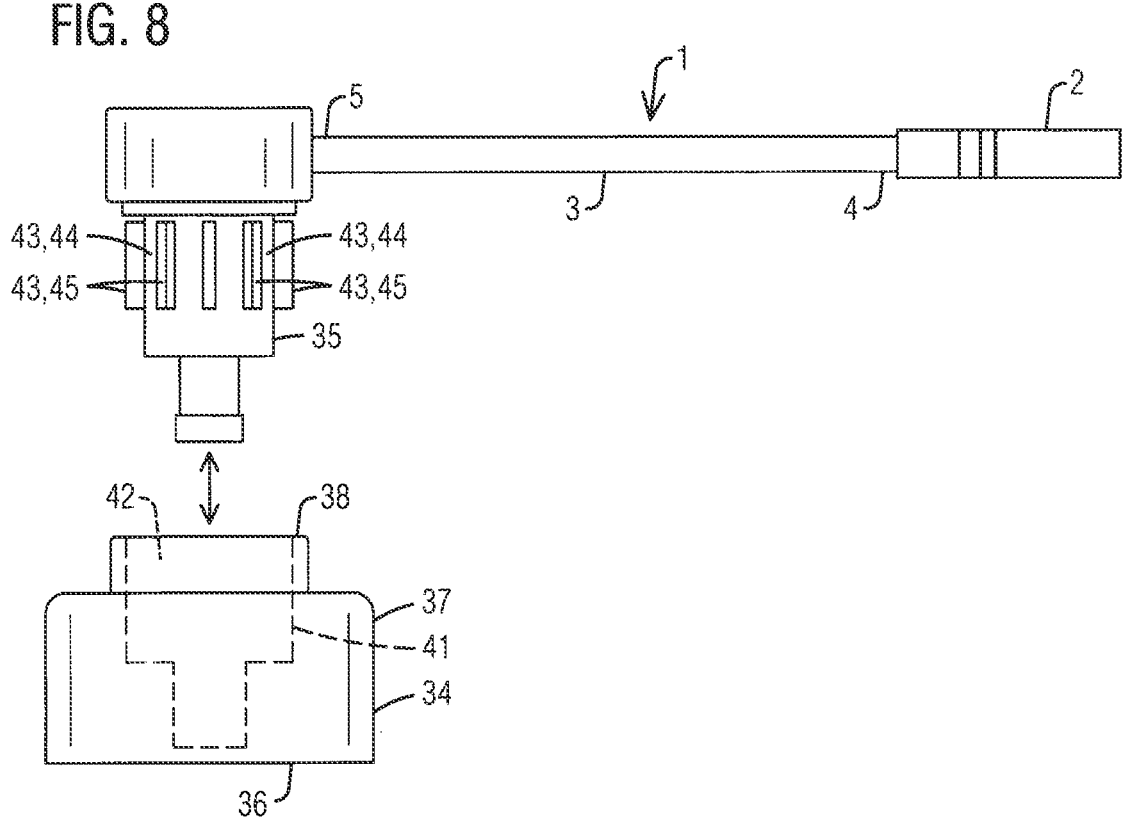
FIG. 8 is an exploded side plan view of a hands free dehooking device of the present invention having a mountable stationary base.
Figure 9:
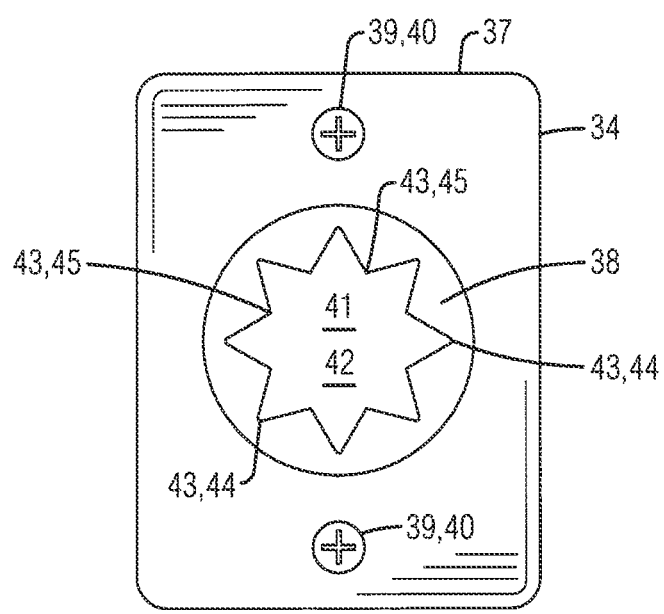
FIG. 9 is a top view of a mountable stationary base of the present invention.

With reference to FIGS. 8 and 9, an exploded side plan view of a hands free dehooking device 1 of the present invention and a top view of a mountable stationary base 34 of the present invention, respectively, are illustrated. The hands free dehooking device 1 of the present invention comprises a preferably rigid ring 2 located on a distal end 4 of an elongated arm 3. A rotating post 35 is located on a proximal end 5 of the arm 3 and is perpendicular to the arm 3, thereby creating an L-shape. The hands free dehooking device 1 comprises a mountable stationary base 34 that attaches to the rotating post 35. The mountable stationary base 34 comprises a bottom surface 36, at least one side surface 37 and a top surface 38. The mountable stationary base 34 attaches to a surface, such as a surface of a kayak or boat railing, via at least one attachment means 39, such as a nut, bolt, washer, screw 40, adhesive, rivet and so forth.

The rotating post 35 is inserted and housed within a huh 41 or tubular-shaped aperture located within the mountable stationary base 34. The hub 41 comprises an opening 42 on the top surface 38 of the mountable stationary base 34 to allow for insertion of the rotating post 35 into the hub 41. This allows the arm 3 and ring 2 to be rotated outward over the side of a kayak or boat and over the water into an operating position. A locking means 43, such as at least one groove 44 and/or at least one ridge 45 may be located on the hub 41 and/or the rotating post 35 to lock the arm 3 and ring 2 into a desired position.

Figure 10:
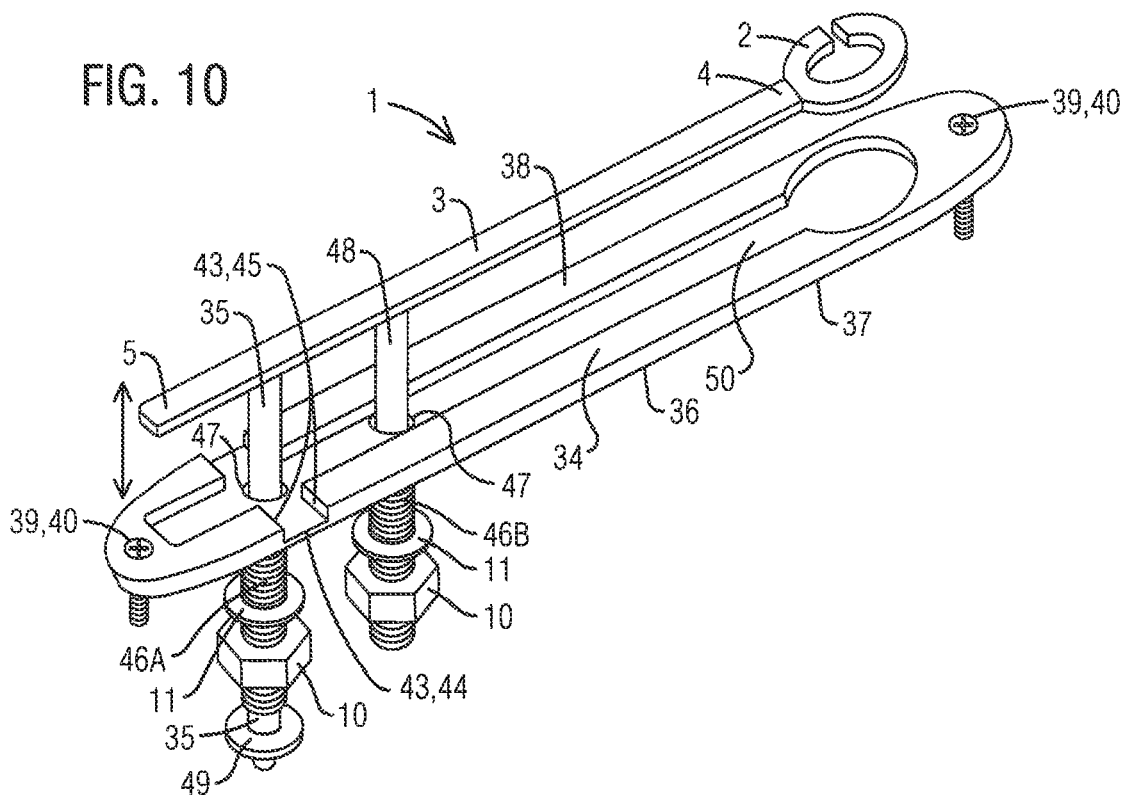
FIG. 10 is a perspective top view of a flush mount hands free dehooking device of the present invention in a partially stored position.
Figure 11:
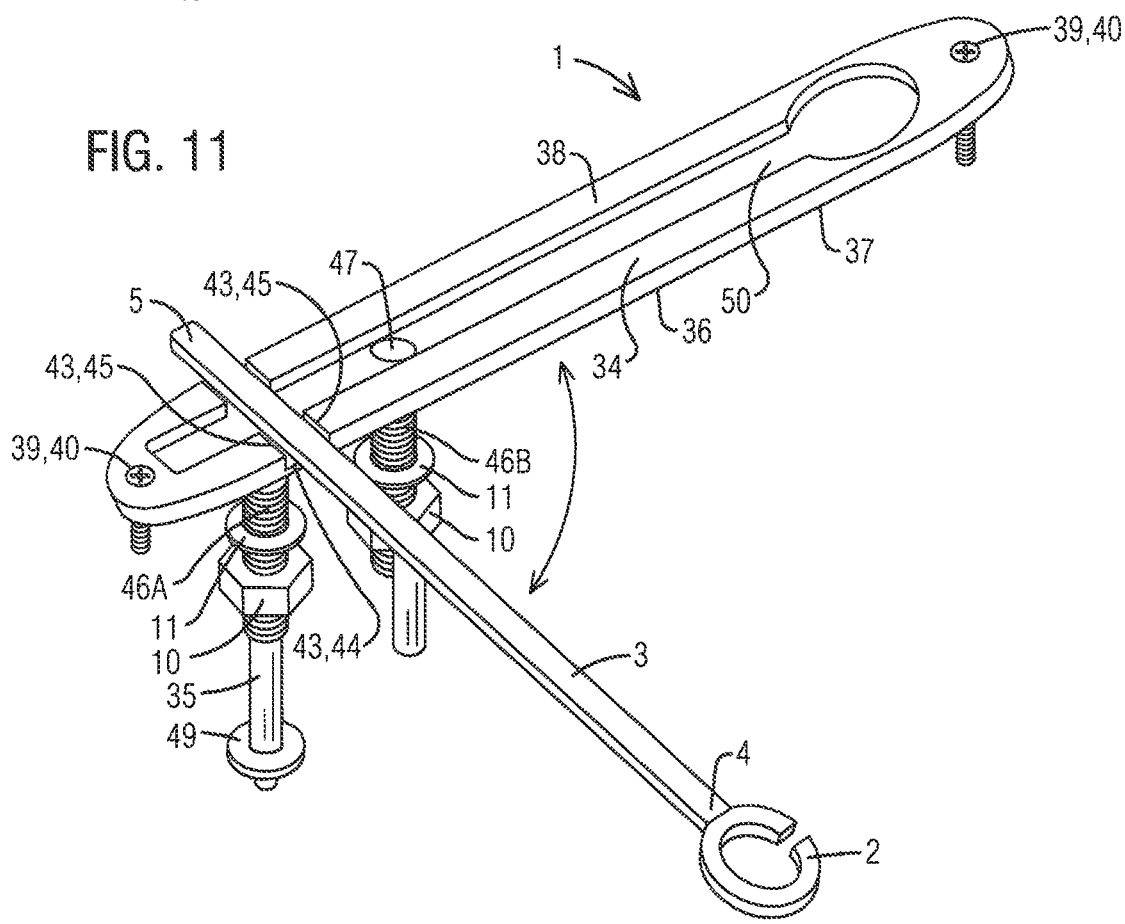
FIG. 11 is a perspective top view of a flush mount hands free dehooking device of the present invention in an operating position.

With reference to FIGS. 10 and 11, a perspective top view of a flush mount hands free dehooking device 1 of the present invention in a partially stored position and a perspective top view of a flush mount bands free dehooking device 1 of the present invention in an operating position, respectively, are illustrated. The hands free dehooking device 1 of the present invention comprises a preferably rigid ring 2 located on a distal end 4 of an elongated arm 3. A rotating post 35 is located on a proximal end 5 of the arm 3 and is perpendicular to the arm 3, thereby creating an L-shape. The hands free dehooking device 1 comprises a mountable stationary base 34 that attaches to the rotating post 35.

The mountable stationary base 34 comprises a bottom surface 36, at least one side surface 37 and a top surface 38. The mountable stationary base 34 attaches to a surface, such as a boat railing, via at least one attachment means 39, such as a nut, bolt, washer, screw 40, adhesive, rivet and so forth. As illustrated here, the mountable stationary base 34 comprises two 15 studs 46, which are preferably threaded, that extend downward from the bottom surface 36 mountable stationary base 34. The studs 46 may be inserted into holes drilled into a railing of a boat and secured using washers 11 and nuts 10. The studs 46 are preferably tubular and hollow and assessable from apertures 47 located in the mountable stationary base 34. The rotating post 35 is inserted and boused within a first stud 46A. A locking post 48 extending downward from the arm 3 and which is parallel to the rotating post 35 may be inserted into a second stud 46B. The locking post 48 is preferably shorter than the rotating post 35 to allow the arm 3 to be lifted high enough to disengage the locking post 48 from the second stud 46B while the rotating post 35 remains engaged with the first stud 46A.

This allows the arm 3 and ring 2 to be rotated outward over the side of a boat and over water into an operating position. A stop 49 is preferably located on the rotating post 35 to prevent rotating post 35 from being pulled completely out of the first stud 46A. A locking means 43, such as at least one groove 44 and/or at least one ridge 45 may be located on the mountable stationary base 34 and/or in the first stud 46A, to lock the arm 3 into a perpendicular position in relation to the mountable stationary base 34 (either over the water or over the deck of the boat) while the dehooking device 1 is in an operating position, as illustrated in FIG. 11. The arm 6 may be sectional, folding, removable and or telescoping, to allow the dehooking device 1 to be used as a cleat for tying off ropes.

The mountable stationary base 34 preferably has a recessed portion 50 that the arm 3 and ring 2 rest in while in a stored position. This creates a substantially flush surface between the mountable stationary base 34, arm 3 and ring 2, thereby reducing the chance of individuals tripping or becoming caught on the hands free dehooking device 1 when not in use.

Figure 12:
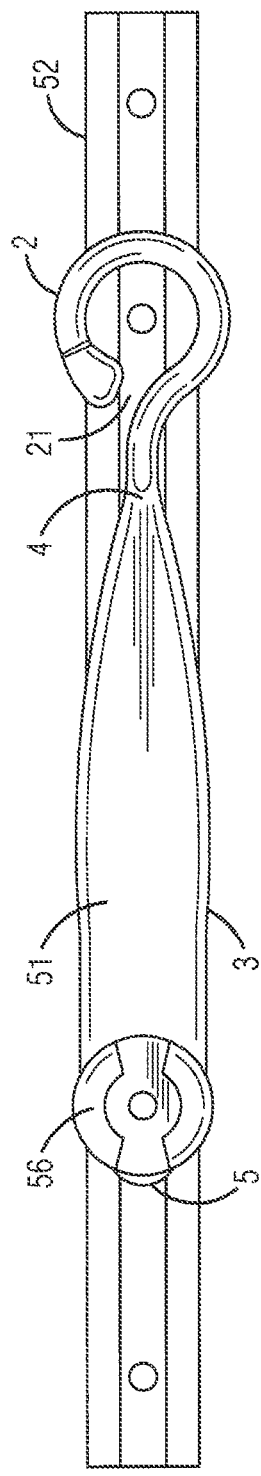
FIG. 12 is a top view of a channel rail mounted hands free dehooking device of the present invention in a stored position for use preferably on a kayak.
Figure 13:
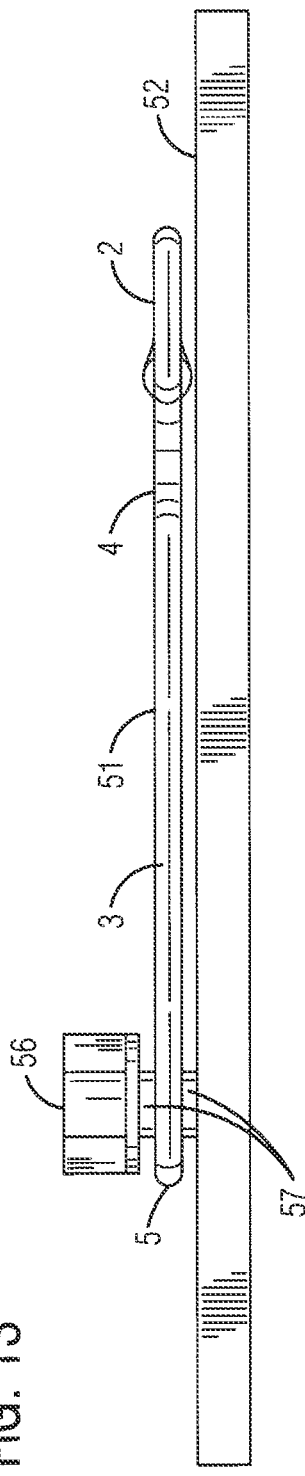
FIG. 13 is a side view of a channel rail mounted hands free dehooking device of the present invention in a stored position for use preferably on a kayak.
Figure 14:
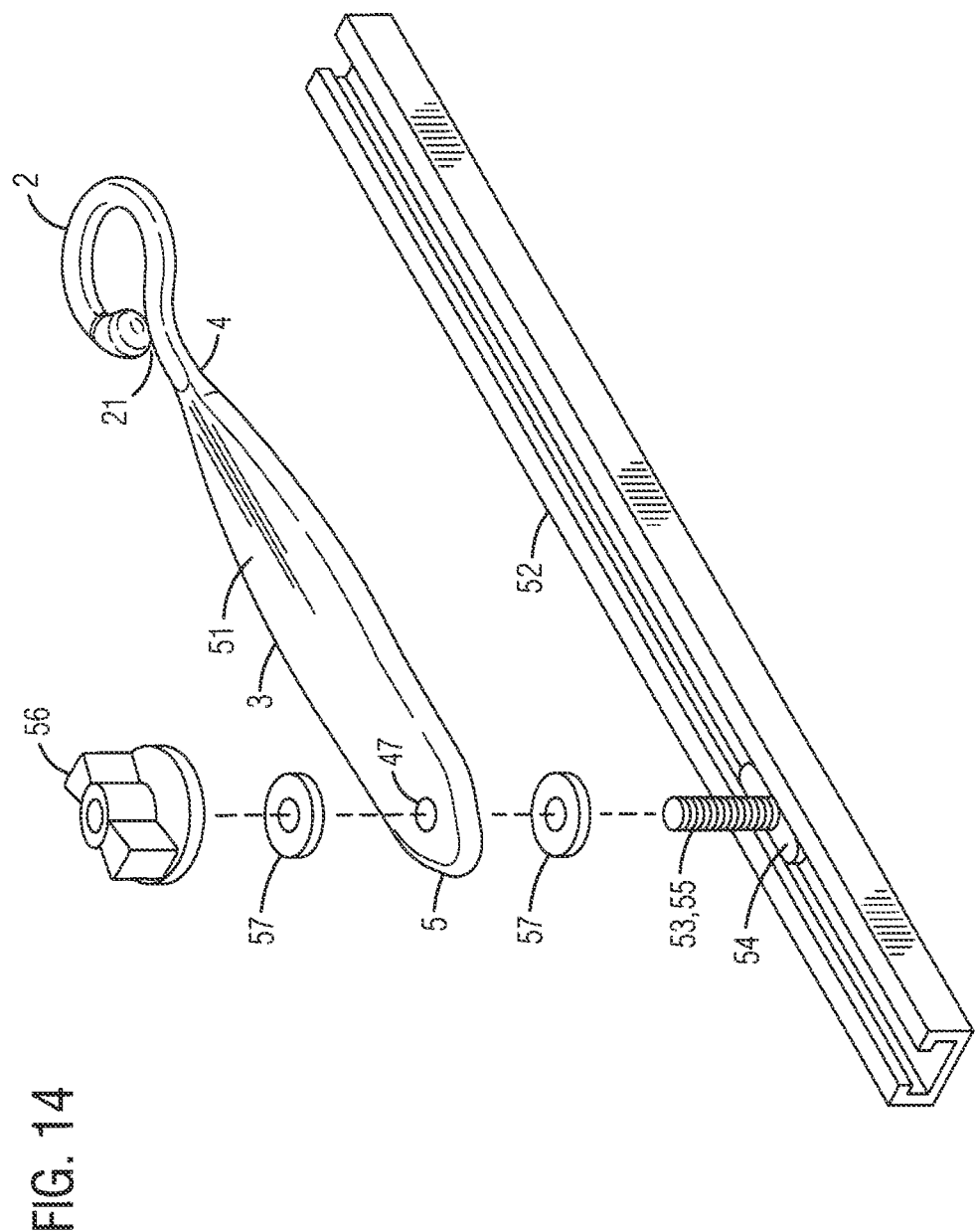
FIG. 14 is a perspective top exploded view of a channel rail mounted hands free dehooking device of the present invention in a stored position for use preferably on a kayak.

With reference to FIGS. 12-14, a top view, side view, and perspective top exploded view, respectively, of a channel rail 52 mounted hands free dehooking device of the present invention in a stored position preferably for use on a kayak are illustrated. The hands free dehooking device 1 of the present invention comprises a preferably rigid ring 2 located on a distal end 4 of an elongated arm 3 wherein a slot 21 is located on the rigid ring 2. The elongated arm 3 further comprises an aperture 47 located on a proximal end 5 of the elongated arm 3. A portion of the elongated arm 3 extending from the proximal end 5 of the elongated arm 3 to the rigid ring 23 preferably comprises a flattened body 51 through which the aperture 47 extends.

The elongated arm 3 may be rotatably and slidably mounted to a substantially U-shaped channel rail 52 via a bolt 53 having a head 54 that engages the channel rail 52. The bolt further comprises a threaded post 55 that extend upward perpendicularly from the channel rail 52. The elongated arm 3 attaches to the threaded post 55 via the aperture 47 located on the proximal end 5 of the elongated arm 3. The elongated arm 3 is secured on the threaded post 55 via a nut 56 and one or more washers 57. The channel rail 52 may be secured to a surface of a kayak or other boat using screw or other attachment means.

Figure 15:
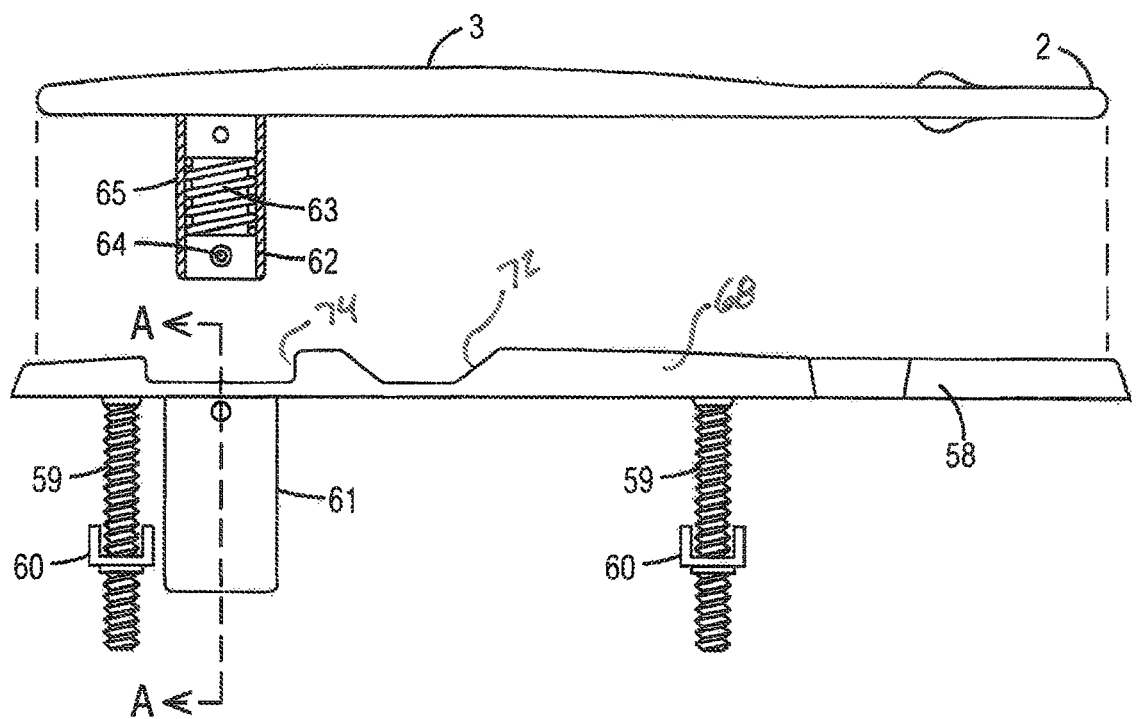
FIG. 15 is a side exploded view of a hands free dehooking device of the present invention for preferably on a boat.
Figure 16:
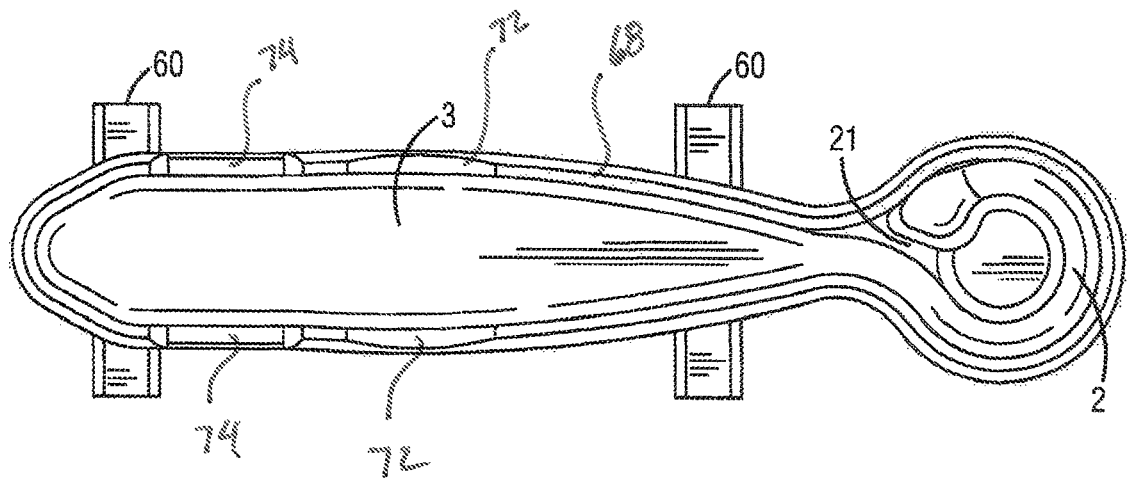
FIG. 16 is a top view of the boat-mounted hands free dehooking device of the present invention.
Figure 17:
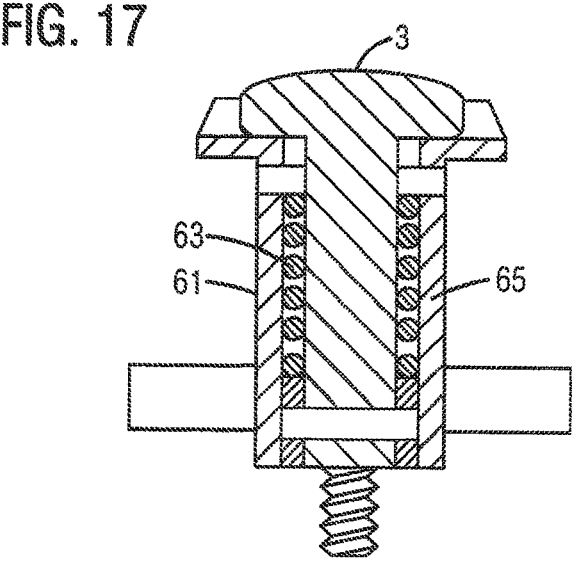
FIG. 17 is a rear cross-sectional view of the boat-mounted hands free dehooking device of the present invention.
Figure 18:
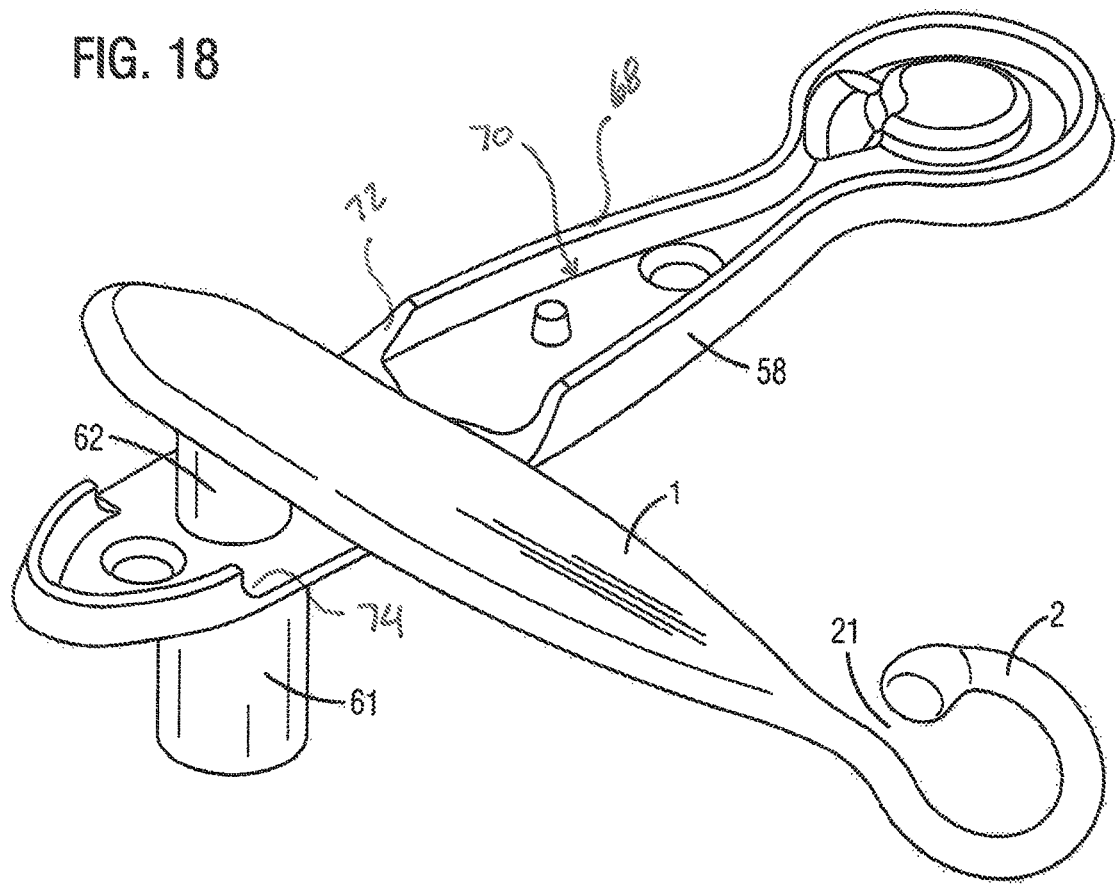
FIG. 18 is a perspective view of the boat mounted hands free dehooking device in a use configuration.
Figure 19:
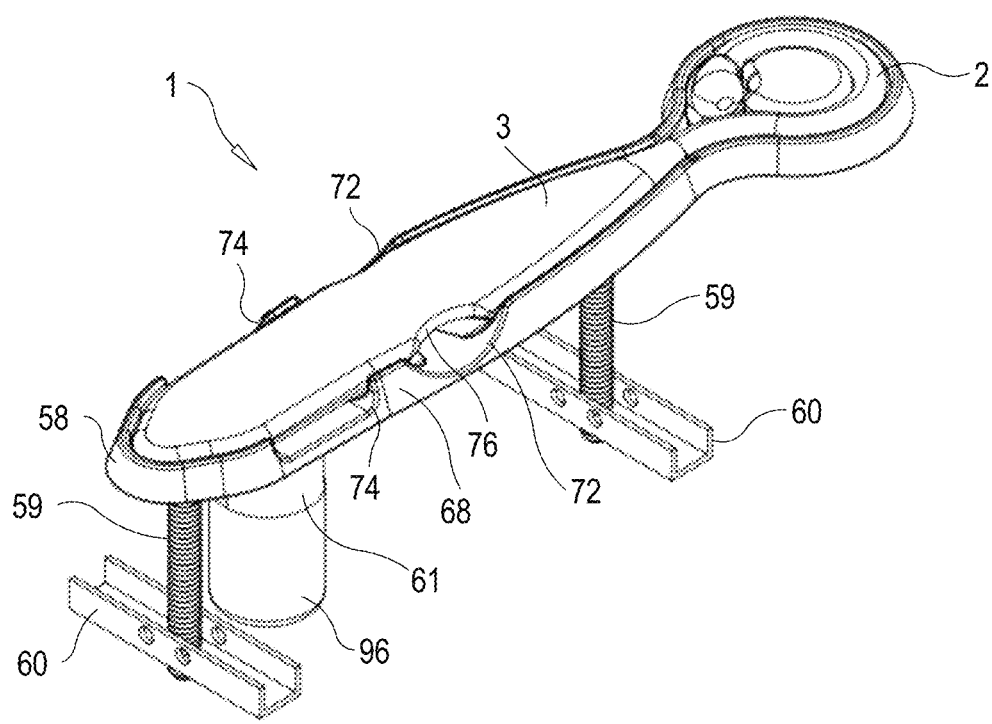
FIG. 19 is a perspective view of a boat mounted hands free dehooking device in a stored configuration.
Figure 20:
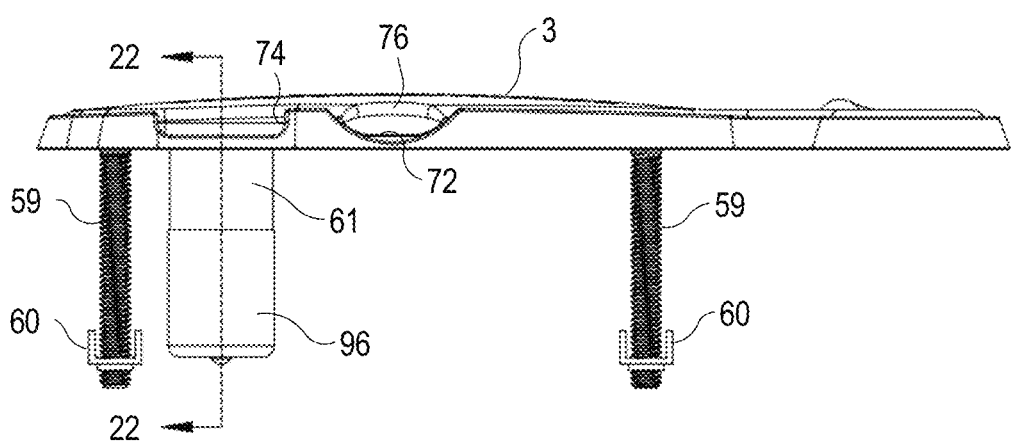
FIG. 20 is a side view of the boat mounted hands free dehooking device of FIG. 19 in a stored configuration.
Figure 21:
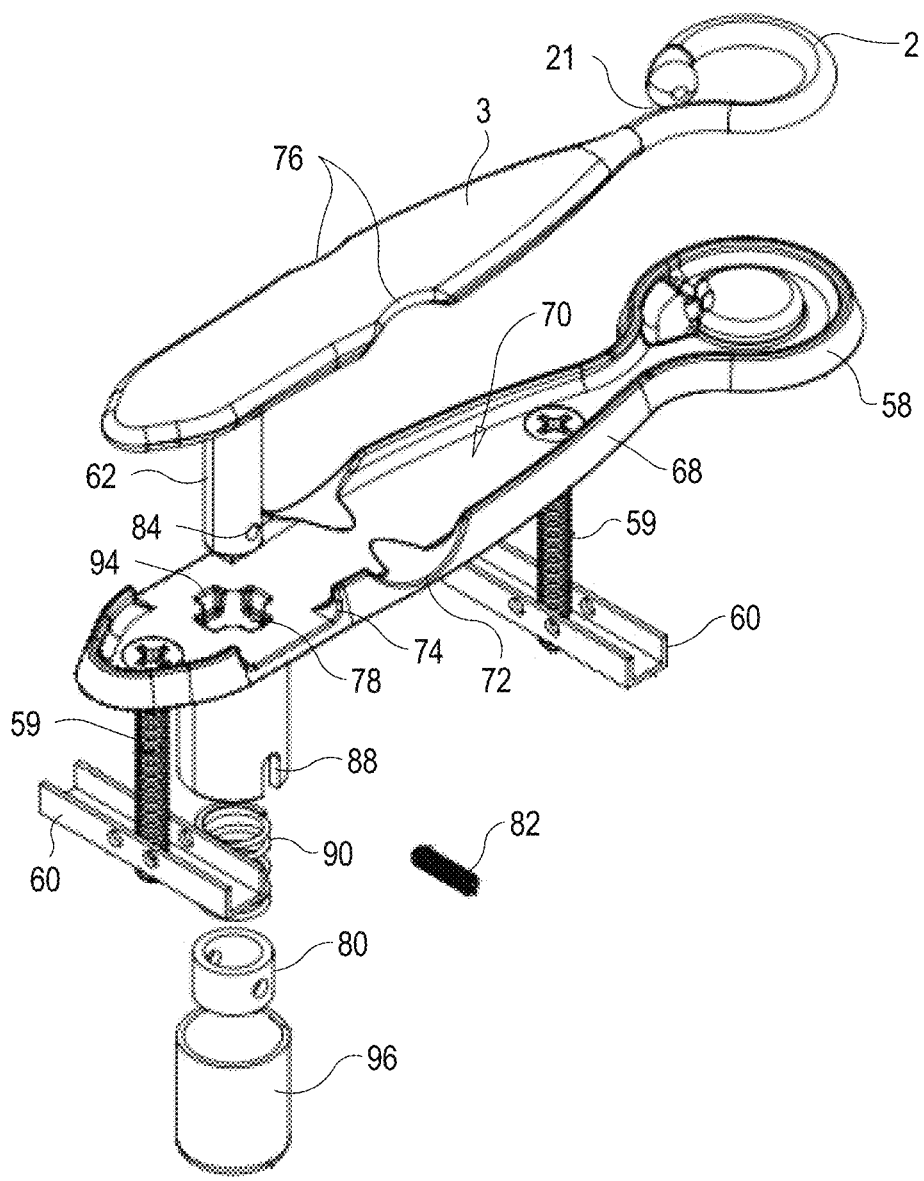
FIG. 21 is a perspective exploded view of the boat mounted hands free dehooking device of FIG. 19.
Figure 22:
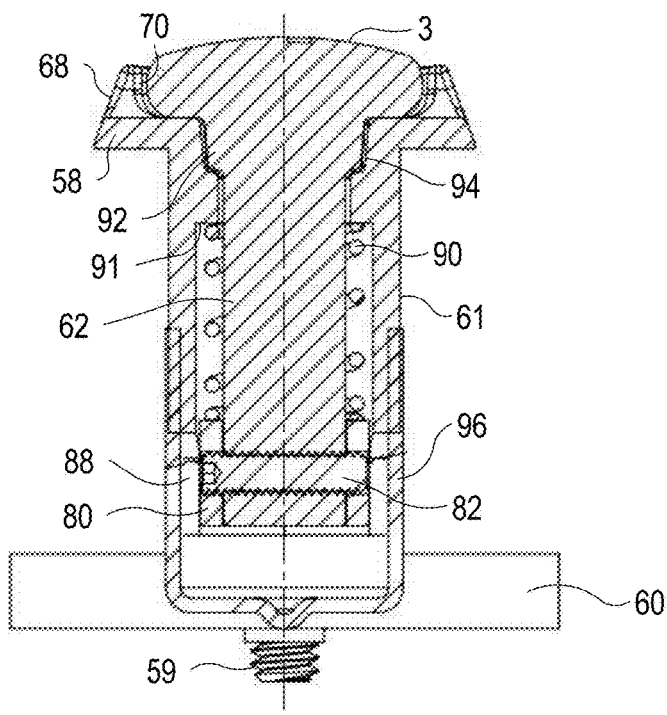
FIG. 22 is cross-section view taken along line 22-22 in FIG. 20.
Figure 23:
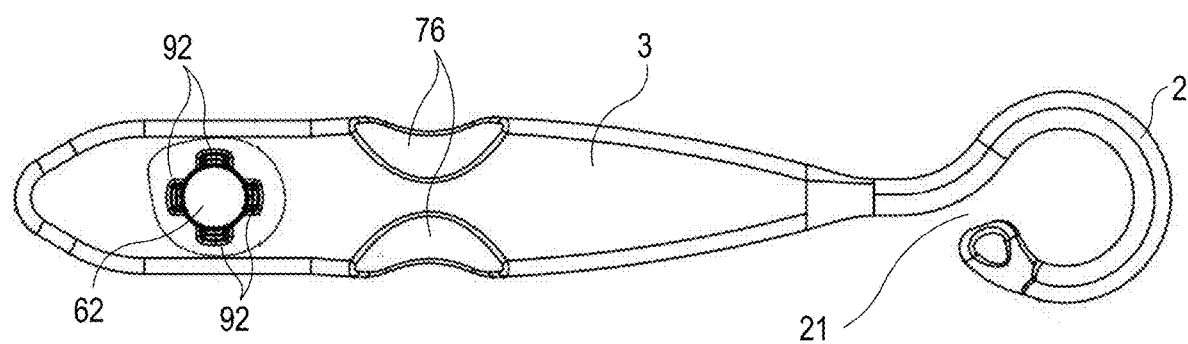
FIG. 23 is a bottom view of an arm of the boat mounted hands free dehooking device of FIG. 19.
Figure 24:
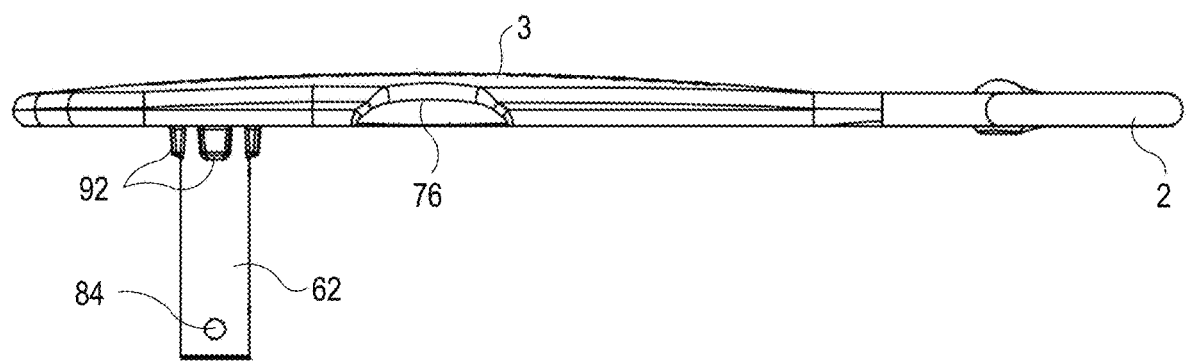
FIG. 24 is a side view of an arm of the boat mounted hands free dehooking device of FIG. 19.

With reference to FIGS. 15-18, a boat-mounted version of the hands free dehooking device of the present invention is shown. The side exploded view in FIG. 15 shows the base plate 58 which can be mounted to a rail on a boat by flat head screws 59 and brackets 60. The base plate 58 has a retaining cylinder 61 for holding the arm stud 62 on a bottom of a proximal end of the arm 3. A spring 63 circumvents the arm stud 62 which is enclosed in a sleeve 65 and is retained by a set screw 64. FIG. 16 shows a top view of the dehooking device 1 when the arm 3 is secured in the base plate 58 and additionally shows the ring 2 and slot 21 for removing a fish ling while dehooking a fish. FIG. 17 shows the spring-mounted arm which is retained by the arm stud 62 in the base plate cylinder 61 until the arm 3 is pulled up and rotated outward at 90 degrees into a position as shown in FIG. 18.

The base plate 58 further includes peripheral sidewall 68 that defines a recess 70. The recess 70 is generally shaped to correspond to the shape of the arm 3, such that the arm 3 is received into the recess when the arm is in the stowed position. Finger notches 72 are formed the sidewall 68, along opposite sides of the base, and allow a user to grip the arm 3 and move the arm into the in-use, rotated position. The peripheral sidewall 68 further includes arm notches 74, along opposite sides of the base, into which the arm 3 is positioned or received when the arm is rotated into the in-use position. Arm notches 74 aid in keeping the arm in position by restraining the arm 3 from rotating relative to the base plate when in the in-use position.

With reference to FIGS. 19-24, there is shown an alternative embodiment of a boat-mounted version of the hands free dehooking device 1. As depicted, dehooking device 1 has an elongated base plate 58 that can be mounted flush against a railing of a boat, for example, by threaded fasteners 59 and brackets 60. The base plate 58 includes peripheral sidewall 68 that defines a recess 70. The recess 70 is generally shaped to correspond to the shape of the arm 3, such that the arm 3 is received into the recess when the arm is in the stowed position. Finger notches 72 are formed the sidewall 68, along opposite sides of the base, and allow a user to grip the arm 3 and move the arm into the in-use, rotated position. The peripheral sidewall 68 further includes arm notches 74, along opposite sides of the base, into which the arm 3 is positioned or received when the arm is rotated into the in-use position. Arm notches 74 can help keep the arm in position by restraining the arm 3 from rotating relative to the base plate when in the in-use position.

As further depicted, arm 3 has finger grips 76 on opposite sides of its length. The finger grips 76 align with the finger notches 72 on the base when the arm is in the stowed position and received in the recess 70, which allows a user to grip the arm more easily when the arm is in the stowed position.

The arm 3 has a stud 62 that extends from a bottom proximal end of the arm and the base plate 58 has a retaining cylinder 61 extending from a bottom of the base plate. The stud 62 is slidably and rotatably disposed in the cylinder 61 by inserting the stud 62 downwardly into the cylinder through hole 78 that is formed in the base plate 58. The stud 62 and cylinder 61 provide a pintle-like coupling that allows the arm to move toward and away from the base plate 68 and to rotate in relation to the base plate.

The stud 62 is captively held in the retaining cylinder 61 by collar 80 which is secured to a bottom end of the stud by a set screw 82 that is threadedly received by bore 84 formed in the stud and which extends through co-aligned holes 86 in the collar. The collar 80 is sized such that it is rotatable and slidable within the cylinder, along with the stud 62. In assembly or disassembly, the set screw 82 can be accessed through one or more slots 88 formed in the sidewall of the retaining cylinder 61.

A spring 90 is disposed around the stud 62 in an annular space between the stud and the inner surface of the retaining cylinder sidewall. One end (the top end) of the spring 90 abuts a shoulder 91 of the cylinder 61 and the other end (the bottom end) abuts the top of the collar 80. The spring 90 operates to bias the stud 62 in a direction inwardly into the cylinder. Stated differently, the spring 90 operates to bias the arm 3 via the stud against the base plate 58. When the arm 3 is moved upwardly in a direction away from the base plate 58, the spring 90 compresses and applies the biasing force against the upward movement of the arm and urges the arm back to the base plate.

A plurality of nubs 92 are located at the top end of the stud 62 and are circumferentially spaced around the stud. Representatively shown, there are four nubs 92. A plurality of nub receiving recesses 94 are circumferentially spaced around the opening of the hole 78 and are configured to removably receive the nubs 92 when the arm 3 is disposed against the base plate 58. Representatively shown, there are four nub recesses 94, one corresponding to each nub 92. The nubs 92 and the nub recesses 94 are arranged such that the nubs are disposed in the recesses when the arm 3 is in the stored position and in the rotated, in-use position. The nubs 92 and the nub recesses 94 help align the arm 3 with the base plate 58 when in either the stored position or the in-use position.

A boot or cap 96 is disposed on the bottom of the retaining cylinder 61 to close the open, bottom end of the cylinder and to protect the elements disposed within the cylinder.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A hands free dehooking device for removing hooks from fish comprising:
   an elongated arm having a distal end and a proximal end and a length extending therebetween;
   a ring located on the distal end of the elongated arm, the ring surrounding a central aperture;
   a slot located in the ring to allow a user to insert a fishing line through the ring and into the central aperture;
   a post extending downward from the proximal end of the elongated arm in a direction perpendicularly to the length of the elongated arm; and
   a base plate having a cylinder extending downwardly from a bottom of the base plate, the cylinder having a cylinder bore and a bore axis longitudinally extending through the geometric center of the bore;
   the post being rotatably and slidably received in the cylinder such that the elongated arm is rotatable about the bore axis relative to the base plate and is slidable along the bore axis relative to the base plate; and
   wherein the elongated arm is movable between a stowed position where the elongated arm is disposed with its length along the base plate and an in-use position wherein the elongated arm is rotated relative to the base plate.

2. The hands free dehooking device of claim 1, further comprising:
   a spring disposed about the post.

3. The hands free dehooking deviceof claim 1, wherein the base plate has a sidewall that defines a recess into which the arm is received when the arm is in the stowed position.

4. The hands free dehooking device of claim 3, wherein the sidewall has a least one finger notch and at least one arm notch formed therein.

5. The hands free dehooking device of claim 4, wherein the arm is disposed in at least one arm notch when the arm is in the in-use position.

6. The hands free dehooking device of claim 1, further comprising:
   a collar attached to a bottom end of the post, the collar captively retaining the post in the cylinder bore.

7. The hands free dehooking device of claim 6, further comprising:
   a spring disposed about the post and extending between the collar and a shoulder of the cylinder bore, wherein the spring biases the post along the bore axis in a direction that urges the arm toward the base plate.

8. A hands free dehooking device for removing hooks from fish comprising:
   an elongated arm having a distal end and a proximal end and a length extending therebetween;
   a ring located on the distal end of the elongated arm, the ring surrounding a central aperture;
   a slot located in the ring to allow a user to insert a fishing line through the ring and into the central aperture;
   a post extending downward from the proximal end of the elongated arm in a direction perpendicularly to the length of the elongated arm; and
   a base plate having a length, a width, and cylinder bore having a bore axis longitudinally extending through the geometric center of the bore;
   the post being rotatably and slidably received in the cylinder such that the elongated arm is rotatable about the bore axis relative to the base plate and is slidable along the bore axis relative to the base plate; and
   wherein the elongated arm is movable between a stowed position where the elongated arm is disposed with its length along the length of the base plate and an in-use position wherein the elongated arm is in a rotated relative to the base plate wherein the length of the arm extends across the width of the base plate.

9. The hands free dehooking device of claim 8, wherein:
the base plate has a sidewall that defines a recess into which the arm is received when the arm is in the stowed position;
the sidewall has a least one finger notch and at least one arm notch; and
wherein the arm is disposed in the at least one arm notch when the arm is in the in-use position.

10. The hands free dehooking device of claim 8, further comprising:
a spring disposed about the post and biasing the post along the bore axis in a direction that urges the arm toward the base plate.

11. The hands free dehooking device of claim 10, further comprising:
a collar attached to a bottom end of the post, the collar captively retaining the post in the cylinder bore; and
wherein the spring extends between the collar and a shoulder of the cylinder bore.

12. The hands free dehooking device of claim 9, wherein the arm has at least one finger grip and wherein the finger grip aligns with the at least one finger notch when the arm is in the stowed position.

\* \* \* \* \*